(12) United States Patent
Cha et al.

(10) Patent No.: US 8,090,743 B2
(45) Date of Patent: *Jan. 3, 2012

(54) DOCUMENT MANAGEMENT SYSTEM AND METHOD

(75) Inventors: Wan Kyu Cha, Kyunggi-do (KR); Jeong Joong Kim, Seoul (KR); Han Joon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 138 days.

This patent is subject to a terminal disclaimer.

(21) Appl. No.: 11/621,870

(22) Filed: Jan. 10, 2007

(65) Prior Publication Data

US 2007/0244882 A1 Oct. 18, 2007

(30) Foreign Application Priority Data

Apr. 13, 2006 (KR) ................. 10-2006-0033660
Apr. 13, 2006 (KR) ................. 10-2006-0033662
Apr. 13, 2006 (KR) ................. 10-2006-0033664

(51) Int. Cl.
*G06F 7/00* (2006.01)
*G06F 17/30* (2006.01)

(52) U.S. Cl. ..................... 707/779; 707/739

(58) Field of Classification Search ............. 707/739, 707/999.005, 779

See application file for complete search history.

(56) References Cited

U.S. PATENT DOCUMENTS

| 6,185,550 B1 * | 2/2001 | Snow et al. ................. 707/1 |
| 6,523,022 B1 * | 2/2003 | Hobbs ......................... 1/1 |
| 7,249,046 B1 * | 7/2007 | Katsurabayashi et al. ....... 705/9 |
| 2001/0034739 A1 * | 10/2001 | Anecki et al. ................ 707/500 |
| 2002/0116363 A1 * | 8/2002 | Grainger ....................... 707/1 |
| 2005/0060643 A1 * | 3/2005 | Glass et al. ................ 715/501.1 |
| 2006/0173920 A1 * | 8/2006 | Adler et al. ................ 707/104.1 |
| 2006/0212441 A1 * | 9/2006 | Tang et al. ..................... 707/5 |
| 2008/0077570 A1 * | 3/2008 | Tang et al. ..................... 707/5 |

OTHER PUBLICATIONS

U.S. Appl. No. 11/621,820 to Cha et al., which was filed on Jan. 10, 2007.
U.S. Appl. No. 11/621,817 to Cha et al., which was filed on Jan. 10, 2007.

* cited by examiner

*Primary Examiner* — Mohammad Ali
*Assistant Examiner* — Patrick Darno
(74) *Attorney, Agent, or Firm* — McKenna Long & Aldridge LLP

(57) ABSTRACT

Provided are a document management system and method. The document management system including a database storing documents and a document classification unit for automatically classifying the documents stored in the database, wherein the document classification unit comprises a feature extraction module extracting features based on a keyword included in the documents and vectorizing the extracted features, a similarity judgment module judging similarity among the documents using vectors formed by the feature extraction module, and a classification system module classifying the documents stored in the database according to a preset classification system, the document classification unit performing document classification according to the classification system with respect to documents provided to the database.

15 Claims, 6 Drawing Sheets

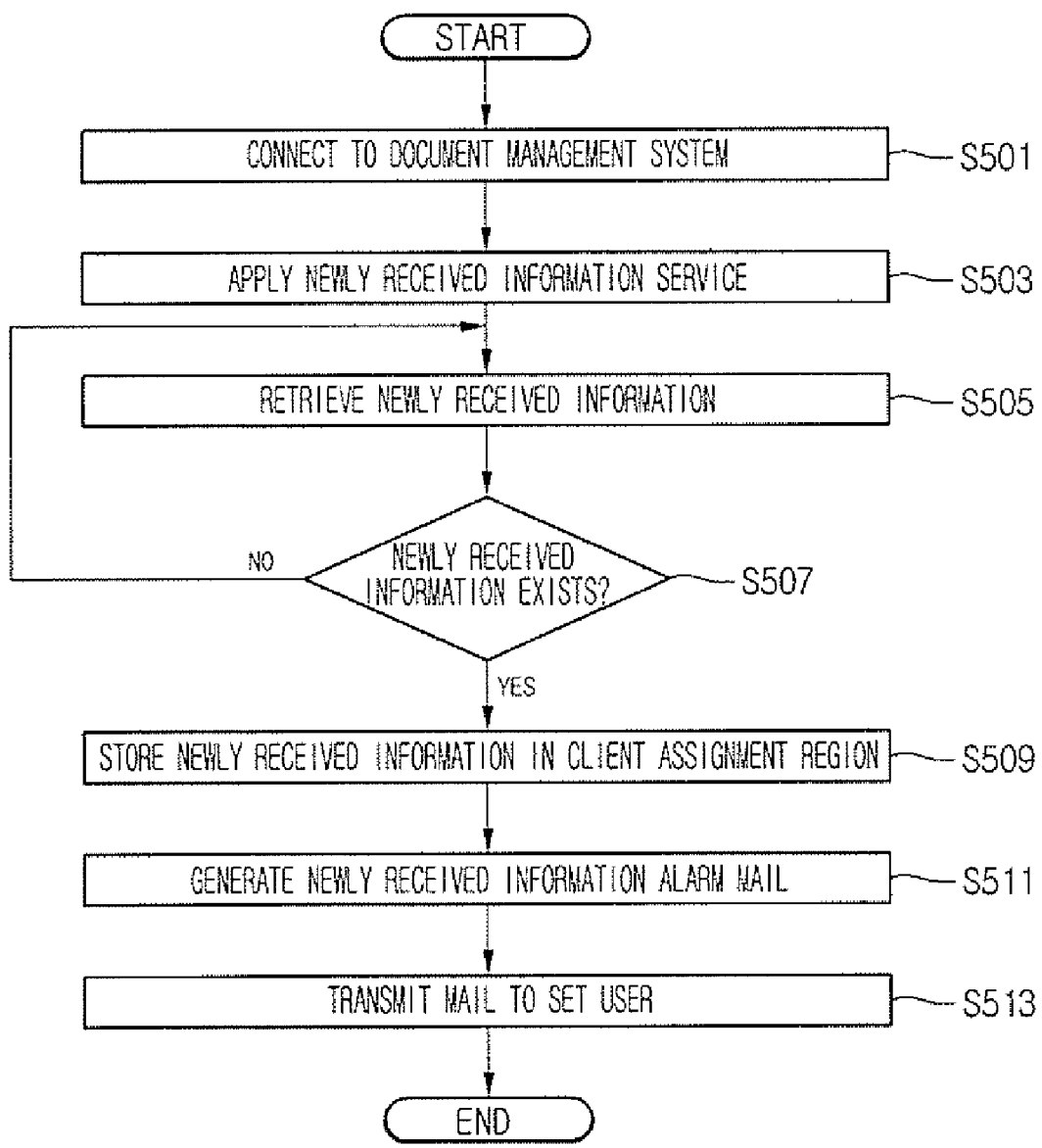

FIG.6

| PROJECT NAME | TEST | | |
|---|---|---|---|
| SDI Type | ⦿ General SDI  611 | ○ LegaStatus SDI  612 | ○ SIMILARITY RETRIEVAL SDI  613 |
| *SDI NAME | | | |
| *RETRIEVAL NATION | ☐ KR  ☐ JP  ☐ PAJ  ☐ US  ☐ CN  ☐ EP  ☐ PCT | | KOREAN ALPHABET RETRIEVAL EXPRESSION INPUT  ENGLISH RETRIEVAL EXPRESSION INPUT |
| *RETRIEVAL EXPRESSION NAME  (614) | | | RETRIEVAL EXPRESSION VERIFICATION |
| *RETRIEVAL EXPRESSION | (INPUTTABLE UPTO 100 BYTE. NOW 0 BYTE INPUT) | | |
| CYCLE  (615) | ⦿ Weekly    ○ Monthly | | |
| INQUIRY PERIOD  (616) | 2005/03/01~2008/03/10(PROJECT OPENING~18 MONTH FROM COMPLETING PROJECT) | | |
| MEMBERS  (617) | ADD  ADD  DEL | | |
| | SELECT | EMPLOYEE ID | NAME | DEPARTMENT | POSITION |
| | ☐ | 111111 | YEO IN JAE | DEVELOPMENT 6 TEAM | MANAGE |
| | ☐ | 222222 | KIM GAP SOO | DEVELOPMENT 6 TEAM | ASSISTANT MANAGE |
| Description | (INPUTTABLE UPTO 100 BYTE. NOW 0 BYTE INPUT) | | |

FIG.7

| No | TEXT | Nation | App.No | Filed | Pul.No | Pul.date | Patent number | Patent Data | Status | Asignee Name |
|---|---|---|---|---|---|---|---|---|---|---|
| 1 | 🗎 | KR | 2004-0062522 | 2004.08.09 | 2006-001-3903 | 2006/02/14 | | | A | LG Innotek |
| 2 | 🗎 | KR | 2004-0062545 | 2004.08.09 | 2006-001-3903 | 2006/02/14 | | | A | Samsung SDI |
| 3 | 🗎 | KR | 1994-5624111 | 2004.08.09 | 2006-001-3903 | 2006/02/14 | 0544109 | 2006/01/11 | B1 | Samsung SDI |
| 4 | 🗎 | KR | 1999-5621354 | 2004.08.09 | 2006-001-3903 | 2006/02/14 | 0544111 | 2006/01/11 | B1 | Samsung SDI |
| 5 | 🗎 | KR | 1995-2351236 | 2004.08.09 | 2006-001-3903 | 2006/02/14 | 0544231 | 2006/01/11 | B1 | Samsung SDI |
| 6 | 🗎 | KR | 1999-2365412 | 2004.08.09 | 2006-001-3903 | 2006/02/14 | 0544123 | 2006/01/11 | B1 | Samsung SDI |
| 7 | 🗎 | KR | 2000-4598521 | 2004.08.09 | 2006-001-3903 | 2006/02/14 | 0544555 | 2006/01/11 | B1 | Samsung SDI |
| 8 | 🗎 | KR | 2001-2232322 | 2004.08.09 | 2006-001-3903 | 2006/02/14 | 0544569 | 2006/01/12 | B1 | Samnna |
| 9 | 🗎 | KR | 2001-2356125 | 2004.08.09 | 2006-001-3903 | 2006/02/14 | 0544874 | 2006/01/15 | B1 | LG Innotek |
| 10 | 🗎 | KR | 2004-0062522 | 2004.08.09 | 2006-001-3903 | 2006/02/14 | 0544554 | 2006/01/11 | B1 | Vosco |

DOCUMENT MANAGEMENT SYSTEM AND METHOD

BACKGROUND OF THE INVENTION

1. Field of the Invention

The present invention relates to a system classifying documents stored in a database to provide information about the stored document to a user, and a document management method.

2. Description of the Related Art

Recently, the amount of documents and knowledge obtained through Internet connection among documents needed for organization is increasing at a steady rate because of rapid expansion and diffusion of an Internet service. Therefore, a document structuring technique, which is preceded for information retrieval such as content-based retrieval, filtering and routing in a mass document information system, becomes highly significant.

When a structure of a basic class taxonomy tree is provided within each of categories by document domain experts, document classifiers extract attribution from documents presently stored or newly inputted in a system and then assign the documents to each of the categories formed in the class taxonomy tree by the attribution.

It is required that the structure of the class taxonomy tree initially set by the domain experts be changed according as the documents are continually assigned. Thus, the domain experts have to change the structure through a close examination of contents of the documents assigned in the categories. That is, in case that new document assemblage not included in the existing class taxonomy tree is inputted, and thus a new category capable of including the new document assemblage is generated, the new document assemblage is annexed to a predetermined position of the class taxonomy tree, or in case that document assemblage capable of being bound into a new category is generated because heterogeneity among contents of the documents included in each of categories is higher, the new category should be divided into two categories or more.

However, a related art document management method, which depends on efforts of person in document classification and a management operation of the class taxonomy tree, has a limit in its application under recent working environment where the document assemblage is continually changed and also the amount of the documents rapidly increases.

Also, each of the classifiers has a different experience and knowledge. Therefore, there is a defect in that it is difficult to continually maintain consistency in the document classification.

SUMMARY OF THE INVENTION

Accordingly, the present invention is directed to a document management system and method that substantially obviates one or more problems due to limitations and disadvantages of the related art.

An object of the present invention is to provide a document management system automatically classifying stored documents according to a predetermined classification system by reading features and similarity among documents from the stored documents in a database, and a document management method.

Another object of the present invention is to provide a document management system automatically classifying new documents inputted from the outside and effectively performing a document management by intellectually managing a class structure of the new documents, and a document management method.

A further object of the present invention is to provide a document management system supervising whether or not new documents are generated in real time or periodically according to a predetermined retrieval condition and informing a user of the supervision result in case that the predetermined retrieval condition is inputted and a newly received information service is applied, and a document management method.

A still object of the present invention is to provide a document management system where a user simply confirms new documents by storing the new documents in a client assignment region in case that the new document has similarity within a predetermined range, and a document management method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a document management system including: a database storing documents; and a document classification unit for automatically classifying the documents stored in the database, wherein the document classification unit comprises a feature extraction module extracting features based on a keyword included in the documents and vectorizing the extracted features, a similarity judgment module judging similarity among the documents using vectors formed by the feature extraction module, and a classification system module classifying the documents stored in the database according to a preset classification system, the document classification unit performing document classification according to the classification system with respect to documents provided to the database.

In another aspect of the present invention, there is provided a document management method including: extracting features from documents stored in a database and judging similarity among the documents using the extracted features; classifying the documents stored in the database according to a predetermined classification system based on the similarity among the documents; and supervising whether or not new documents are provided to the database, and automatically performing the extracting of the features and the classifying of the documents with regard to the new documents in case that the new documents are provided.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a flowchart illustrating a document management method according to another embodiment of the present invention;

FIGS. 6 and 7 view a user interface provided to the user for a document management.

DETAILED DESCRIPTION OF THE INVENTION

Reference will now be made in detail to the preferred embodiments of the present invention, examples of which are illustrated in the accompanying drawings.

Figure 1:
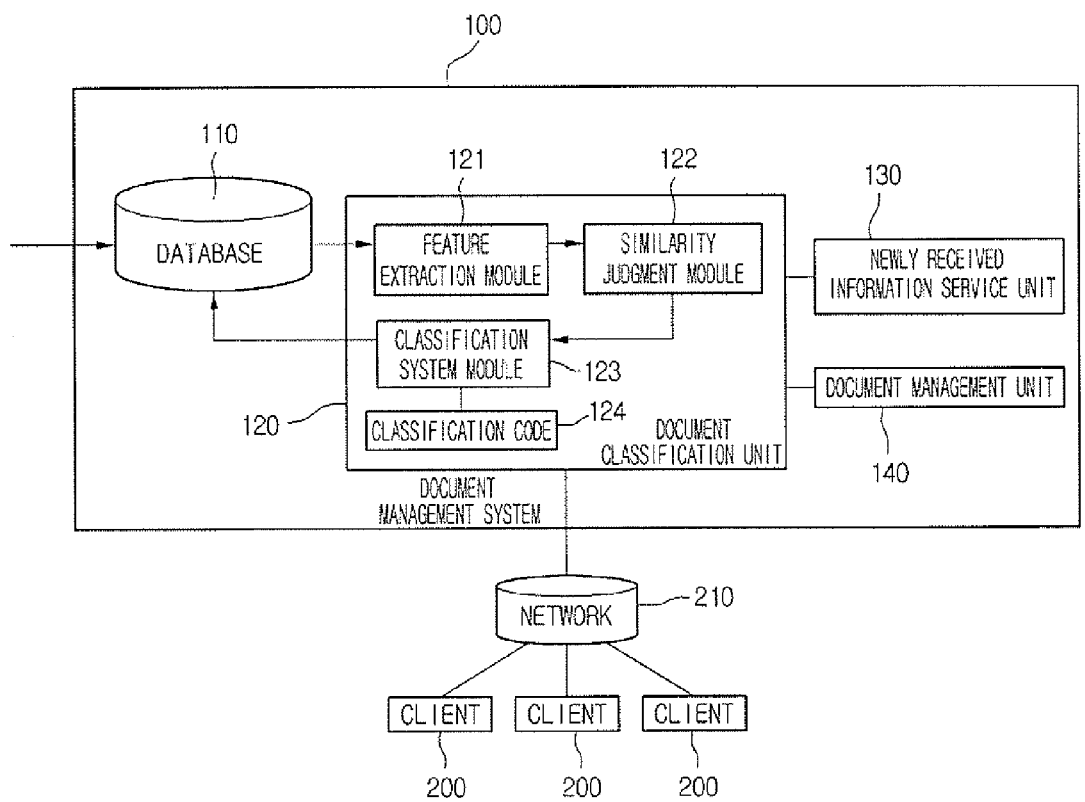
FIG. 1 is a block diagram illustrating a document management system according to the present invention.

FIG. 1 is a block diagram illustrating a document management system according to the present invention.

Referring to FIG. 1, a document management system 100 classifies and manages documents stored in database according to their similarity. A client 200 is connected to the document management system 100 and retrieves the classified documents or receive information provided from the document management system 100.

The client 200 includes an input module where a user transmits a predetermined query to the document management system 100 and an output module, which receives the document information transmitted from the document management system 100 to display the transmitted information for the user.

A variety of communication networks 210 such as an Internet and a local area network (LAN) are used as a communication medium between the document management system 100 and the client 200.

The document management system 100 includes a document classification unit 120, a newly received information service unit 130 and a document management unit 140. The document classification unit 120 classifies documents stored in a database 110 according to their similarity or classifies the documents according to a classification system. The newly received information service unit 130 provides newly received information to the user according to newly received information update setting set by the user. The document management unit 140 manages legal status of the documents stored in a database 110.

Also, a hardware configuration of the document management system 100 is not specially confined. For example, the clustering system, i.e., the document management system 100 can be implemented using a computer having a central processing unit (CPU) or a memory unit (a read-only memory (ROM), a random access memory (RAM) and a hard disk).

Although the database 110 mainly stores a published patent document or a registered patent document, the prevent invention is not limited thereto. However, an example to be described below will be explained on the assumption that the published patent document or the registered patent document including a 'BACKGROUND OF THE INVENTION', a 'SUMMARY OF THE INVENTION' and a 'DETAILED DESCRIPTION OF THE PREFERRED EMBODIMENTS' as identification items for dividing each part of the document.

In this case, the legal status is included in bibliographic information of patent documents. Examples of the legal status are a 'Non-Final Action Mailed', a 'Final Action Mailed' or 'Patent Case'.

A plurality of patent documents are stored in the database 110. Although not shown, the patent documents may be obtained from another web server connected to a network by using a web robot.

Also, the document classification unit 120 can supervise whether or not new documents are provided to the database 110 in real time or according to a period set by the user Classification of documents by the document classification unit 120 is also performed with respect to the new documents.

The document classification unit 120 includes a feature extraction module 121, a similarity judgment module 122 and a classification system module 123. The feature extraction module 121 extracts features from the documents stored in the database 110 and victories the extracted features. The similarity judgment module 122 judges similarity among documents from vectors of documents formed by the feature extraction module 121. The classification system module 123 classifies the documents stored in the database 110 according to the similarity among the documents judged by the similarity judgment module 122.

Also, the classification system module 123 can classify the documents stored in the database 110 with reference to a classification code 124 classified in units of technology fields in addition to classifying the documents according to the similarity among the documents judged by the similarity judgment module 122.

Moreover, the feature extraction module 121 plays a role in extracting the features from the documents stored in the database 110 to vectorize the extracted features.

Also, the document stored in the database 110 may have a text type such as doc, hwp, pdf, txt, html, xls and ppt in order to perform vectorizing of the documents extracted by the feature extraction module 121.

Also, the feature extraction module 121 may perform morphological analysis for classifying a word from particulars recorded in a document in order to extracting features (for example, a keyword or an index term) from the document.

For example, words can be determined by finding a space as a clue in languages using a space between words such as English or Korean language. However, a processing for judging words is required preferentially in order to use the word as the keyword or the index term in languages, which does not have the word separation between the words such as Japanese language, and many other languages of Asia.

Also, the feature extraction module 121 can perform a function assigning weights to the features extracted from the documents. In this case, the features extraction module 121 assigns the weights such that importance of features having exhaustibility and particularity is improved.

$$\begin{bmatrix} 1 & 0 & 5 & 2 & 3 \\ 0 & 3 & 3 & 2 & 0 \\ 3 & 2 & 0 & 4 & 0 \\ 6 & 6 & 8 & 7 & 5 \\ 4 & 1 & 4 & 0 & 0 \\ 0 & 5 & 0 & 3 & 2 \end{bmatrix} \quad [\text{MATH 1}]$$

Each of rows t1, t2, t3, t4, t5 and t6 corresponds to features of the documents, and each of columns d1, d2, d3, d4 and d5 corresponds to the documents stored in the database 110 in the matrix.

A matrix element "aij" indicates an occurrence frequency where an index term ti appears in a document "dj".

As such, each of rows of the matrix indicates distribution where the features appear in the documents and each of columns indicates feature distribution of the documents.

In assigning the weight based on the occurrence frequency of the document feature, a word having excessively high occurrence frequency is of little avail in characterizing the document. Thus, a stopword list may be used for an incongruent word that does not act as the document feature.

From this point of view, the feature extraction module 121 can adopt a relative frequency as the weight, which is calculated by dividing the number of appearance of all keywords within a document by an occurrence frequency of a keyword extracted from the document.

An embodiment regarding this case can be performed by a following math expression.

$$W = \frac{tf(t,d)}{\sum_{s \in d} tf(t,d)}$$ [MATH 2]

Here, the numerical formula tf(t,d) indicates an occurrence frequency of a keyword "t" appearing in a specific document "d".

Figure 2:
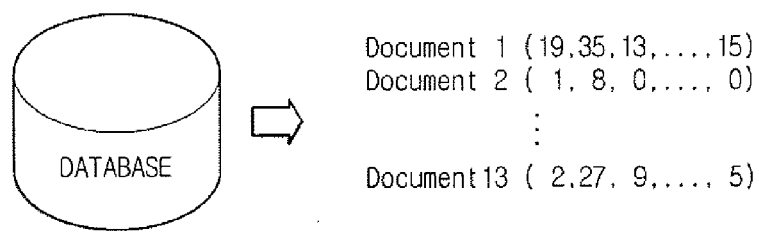
FIG. 2 is a view illustrating a vectorized document using features extracted from a document.

Also, the feature extraction module 121 can vectorize each of documents as illustrated in FIG. 2 using the document feature such as the keyword or the index term extracted from the document as described above.

For example, in a document "1" among the documents stored in the database 110, a first feature appears nineteen times, a second feature appears thirty-five times and a last feature appears fifteen times.

Likewise, vectors having features corresponding to documents to be analyzed may be formed by the above method.

Also, the similarity judgment module 122 can judge the similarity among the individual documents using the vectors formed by the feature extraction module 121. In this case, the similarity judgment module 122 may use a cosine value between each of vectors in order to judge similarity among the documents.

For example, the similarity judgment module 122 can judge similarity among the documents using the vectors of the documents formed by the feature extraction module 121 by a following math expression.

$$\sigma(dx, dy) = \frac{\sum_{i=1} x_i \cdot y_i}{\sqrt{\sum_{i=0} x_i^2 \times \sum_{i=1} y_i^2}}$$ [MATH 3]

Also, the document classification system module 123 classifies and systematizes the documents stored in the database 110 according to the similarity judgment result among the documents by the similarity judgment module 122.

The document classification system module 123 classifies the documents stored in the database 110 according to a classification system, which can be predetermined criteria so that a specific document is more quickly retrieved from the documents stored in the database 110 and a clustering of the stored documents is rapidly performed.

Also, the similarity judgment among the documents and the classification system by the similarity judgment module 122 and the classification system module 123 are performed on a document newly provided to the database 110. Therefore, the document stored in the database 110 can be automatically classified.

Figure 3:
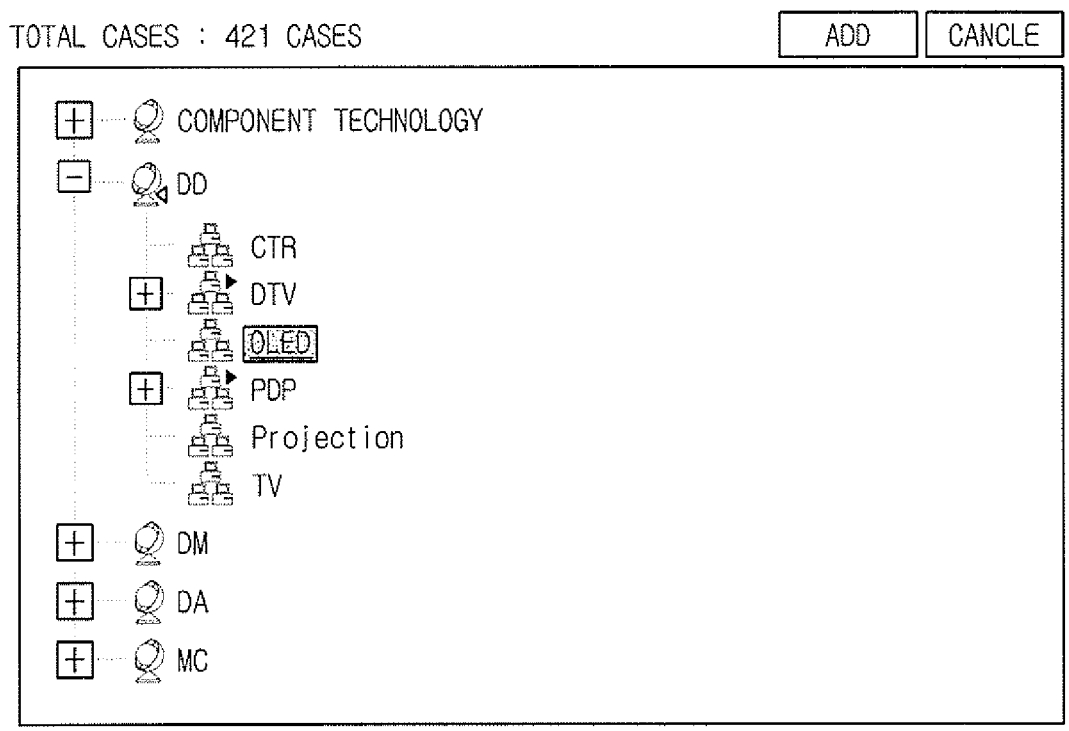
FIG. 3 is a view illustrating a classification code according to an embodiment of the present invention.

Also, the classification system module 123 can refer to the classification code 124 as illustrated in FIG. 3 and the user can classify the document stored in the database 110 according to the classification code 124 through a predetermined input module.

That is, codes classified in units of technology fields are included in the classification code 124 illustrated in FIG. 3. For example, in case that the user retrieves a document corresponding to an organic light-emitting diode (OLED) from the database 110, a specific code assigned in the classification code 124 corresponding to a document, e.g., the OLED, is selected among lists included in a directives documentation (DD) to classify the document according to the classification code 124

Each of codes (for example, cathode ray tube (CRT), digital television (DTV), OLED, plasma display panel (PDP), projection and television) provided in the classification code 124 has feature values, which become their classification criteria. Therefore, the documents can be mapped onto the classification code 124 using features of the documents extracted by the feature extraction module 121.

As described above, the feature extraction module 121, the similarity judgment module 122 and the classification system module 123 can perform the same service for documents newly provided into the database 110. Therefore, the above method can save the user's trouble of classifying the new documents by hand.

Figure 4:
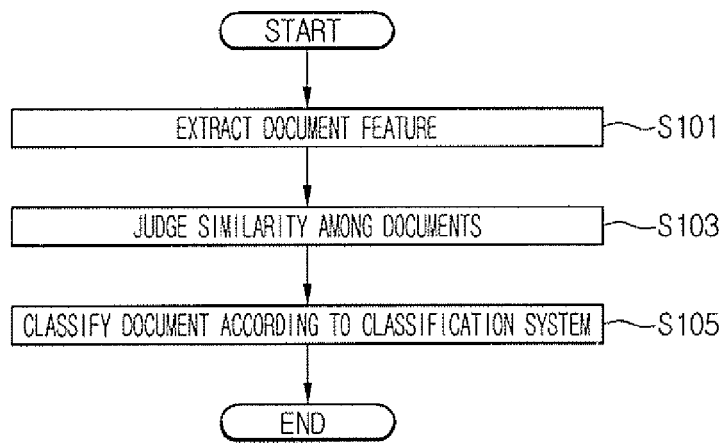
FIG. 4 is a flowchart illustrating a document management method according to an embodiment of the present invention.

FIG. 4 is a flowchart illustrating a document management method according to an embodiment of the present invention. Features (for example, the keyword or the index term) are extracted from each of documents stored in the database 110 by the feature extraction module 121 (S101). In this case, a weight-assigning operation may be further performed on the features extracted by the feature extraction module 121 and a vectorizing operation based on the extracted features is performed.

The similarity among the documents is judged by the classification system module 123 (S103). The similarity among the documents can be calculated using the vectors for each of the documents formed by the feature extraction module 121.

The similar documents are classified into the same class by the classification system module 123, or the documents are classified according to the classification code 124 (S105).

As described above, similarity of the new documents, which are provided to the database 110 to the documents previously stored by the similarity judgment module 122, can also be judged and the new documents can be classified according to the classification code 124.

Meanwhile, it is possible that documents collected by a predetermined web robot are newly stored. In this case, the document classification unit 120 performs a classification process on the new documents by the above-described method.

The newly received information service unit 130 can provides predetermined information such that the user knows information about the newly stored documents. This will be described with reference to FIGS. 5 through 7.

FIG. 5 is a flowchart illustrating a document management method according to another embodiment of the present invention and FIGS. 6 and 7 view a user interface provided to the user for a document management.

Referring to FIGS. 5 through 7, a user accesses a document management system 100 from a client 200 (S501).

The user writes a newly received information service application as illustrated in FIG. 6 (S503).

A service type section key that indicates a kind of a newly received information service is set in the newly received information service application. A case that a document stored/managed in a database 110 is a patent document of a text file type will be described below.

The newly received information service application includes a general selective dissemination of information (general SDI) 611, a legal SDI 612 and a similarity retrieval SDI 613. The general SDI 611 provides a new document corresponding to a predetermined retrieval expression to the user. In case that a legal status of a specific document stored in the database 110 is changed, the legal status SDI 612 informs the user of the changed legal status. In case that a new document similar to the specific document stored in the database 110 is provided, the similarity retrieval SDI 613 informs the user of the provided document.

FIG. 6 shows a user interface for inputting an update condition provided to the user in case that the general SDI 611 is selected. In case that the legal status SDI 612 and the similarity retrieval SDI 613 are selected, the user interface for selecting a specific document among documents stored in the database 110 is provided.

FIG. 6 is a view illustrating a retrieval condition 614 for inputting a project name, a retrieval nation, a retrieval expression name and a retrieval expression. The document classification unit 120 determines whether or not a keyword inputted in the retrieval expression is included in the document provided to the database 110.

There is provided an update period 615 of the a document by the newly received information service unit 130, a duration 616 when a service provided by the newly received information service unit 130 is performed and a setting 617 about the user using the newly received information service unit 130.

The newly received information service unit 130 retrieves or supervises a new document provided to the database 110 (S605). In case that a new document corresponding to the retrieval condition or the update condition set by the user exists (S607), a new document corresponding to a client assignment region partitioned in the database 110 is stored (S609).

The newly received information service unit 130 generates a newly received information alarm mail which will be sent to a user recorded at the user setting 617 (S611), and provides information about a new document to the user through the generated alarm mail (S613).

The user can access the document management system 100 through the provided alarm mail. In this case, the information about the new document can be provided to the user as illustrated in FIG. 7.

A select key 781 may be provided for selecting a specific document in the information about the provided new document and a management key (for example, a my project transmission) 719 may be formed for clustering or separately managing the selected documents. Therefore, it is possible that the user confirms a document corresponding to the predetermined retrieval condition or the update condition, and deletes some of documents or separately manages or clusters some of documents. Also, it is possible that the documents stored in the database are efficiently managed.

Meanwhile, in case that the document stored in the database 110 is a patent document, a publication date and a publication number are included and described in bibliographic information of the document when the document is published.

In case of a United States Patent and Trademark Office (USPTO), a "Non-Final Action Mailed", "Final Action Mailed" or "Patent Case" are provided as a status.

In the present invention using the above method, legal information granted in the patent document can be classified and the classified information can be provided to the user. A role of a document management unit 140 will be described emphatically with reference to FIG. 8.

Figure 8:
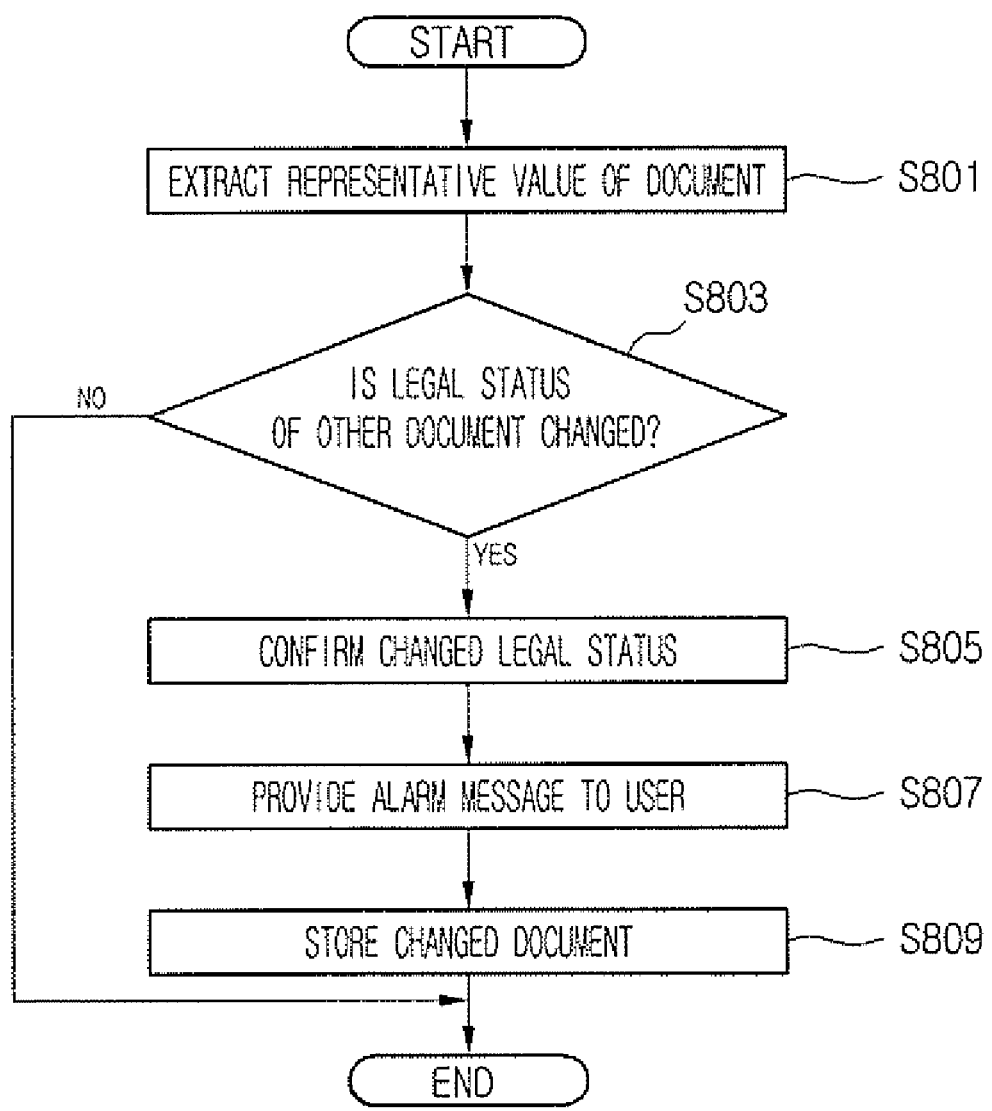
FIG. 8 is a flowchart illustrating a document management method according to further another embodiment of the present invention.

FIG. 8 is a flowchart illustrating a document management method according to further another embodiment of the present invention.

Firstly, predetermined documents are selected by a user. In this case, the user can selects the predetermined documents using a document retrieval result corresponding to a predetermined keyword input.

Thus, a representative value (for example, an application number, a publication number and a registration number) of a document for identifying each of documents by the document management unit 140 is extracted from selected documents (S801).

Also, the document management unit 140 determines whether or not a legal status of the selected document among documents stored in the database 110 is changed (S103).

That is, the determination of whether or not the legal status of each of the paten documents is changed, may be performed by determining whether or not a publication date (or the publication number) is included in bibliographic information of each of the documents and whether or not a registration date (or the registration number) is included in bibliographic information of each of the documents.

Meanwhile, a web site (http://www.uspto.gov/patft/index.html or http://ep.espacenet.com/?locale=EN_ep) providing the patent document provides a legal status (publication, registration, opposition to the grant, judgment and revocation) together with a text body of the patent document. In this case, the document management unit 140 can confirm the legal status of the patent document provided from the web site.

As a judgment result of the document management unit 140, in case that a legal status of a specific document is changed, the changed contents are provided to the user by the newly received information service unit 130 (S807). The newly received information service unit 130 can use a predetermined mail service for informing the user of the changed legal status of the document. Therefore, the user confirms the received mail through the client 200 and confirms the changed legal status of the specific document.

Documents provided through the web site and information about legal status of the documents can be stored in the database 110 (S809).

According to the embodiment of the present invention as described above, it is possible to remove the inconvenience caused by performing a retrieval each time in order that the user may confirm the legal status of the specific document.

This invention may, however, be embodied in many different forms and should not be construed as limited to the embodiments set forth herein; rather, these embodiments are provided so that this disclosure will be thorough and complete, and will fully convey the scope of the invention to those skilled in the art.

What is claimed is:

1. A document management system that manages the storage and classification of documents and distributes information associated with the documents to a user, the system comprising:

a storage unit that stores documents to construct a database; and a document processing unit that provides a user with a newly received information service application form that includes a service type section for setting a type of a newly received information service and an informing condition section for detecting a user-concerning document; receives a newly received information service application input from the user, the newly received information service application input comprising an input that selects the type of the newly received information service from a general selective dissemination of information service, a legal selective dissemination of information service and a similarity retrieval selective dissemination of information service; monitors newly received documents in accordance with the newly received information service application input; and informs the user of information on a newly received document that corresponds to an informing condition, the document processing unit comprising a processor, wherein if the general selective dissemination of information service is selected as the newly received information service, the document management system receives a retrieval expression from the user as the informing condition, determines whether a newly received document corresponds to the retrieval expression, and informs the user of the information on the newly received document if the newly received document corresponds to the retrieval expression, wherein if the legal selective dissemination of information service is selected as the newly received information service, the document management system receives an input that designates a reference document that was previously stored in the storage unit as the informing condition, extracts a representative value of the reference document, compares the reference document with a corresponding newly received document using the representative value, determines whether a legal status of the reference document is different from that of the corresponding newly received document, and informs the user of the information on the newly received document if the legal status of the reference document is different from that of the corresponding newly received document, and wherein if the similarity retrieval selective dissemination of information service is selected as the newly received information service, the document management system receives an input that designates a reference document that was previously stored in the storage unit as the informing condition, determines whether a newly received document is similar to the reference document, and informs the user of the information on the newly received document if the newly received document is similar to the reference document.

2. The document management system according to claim 1, wherein the document processing unit further automatically classifies the documents stored in the storage unit, the document processing unit comprising:
a feature extractor that extracts features based on a keyword included in the documents and vectorizes the extracted features;
a similarity determiner that determines similarity among the documents using vectors formed by the feature extractor; and
a classifier that classifies the documents previously stored in the database according to a predetermined classification system, and
wherein the document processing unit monitors in real time or according to a specific period whether new documents are provided to the database, and the determination of similarity by the similarity determiner and classification of the documents by the classifier are performed on the newly provided document to the database so as to automatically classify the newly provided document in the database.

3. The document management system according to claim 1, wherein the informing condition is a retrieval expression, and the document processing unit detects the specific document which corresponds to the retrieval expression among the newly received document and informs the user of the information on the detected document.

4. The document management system according to claim 1, wherein the informing condition is a reference document stored in the storage unit, and the document processing unit detects the specific document which is similar to the reference document and informs the user of the information on the detected document.

5. The document management system according to claim 4, wherein the document processing unit transmits an alarm message to the user when the specific document is detected.

6. The document management system according to claim 5, wherein a user setting associated with receiving the alarm message is modifiable by the user.

7. The document management system according to claim 2, wherein the degree of similarity of the documents determined by the similarity determiner is settable by the user.

8. The document management system according to claim 1, wherein each of the documents stored in the storage unit comprises at least one of patent publication documents and issued patent documents.

9. The document management system according to claim 1, wherein the informing condition is a reference document stored in the storage unit, and the document processing unit detects a change of a legal status of the reference document using the newly received document and informs the user of the detected change.

10. A method for managing documents using a document management system, the document management system comprising a storage unit that stores documents to construct a database and a document processing unit comprising a processor that detects a specific document among newly provided documents and informs the user of an information on the detected document, the method comprising:
providing a user with a newly received information service application form that includes a service type section for setting a type of a newly received information service and an informing condition section for detecting a user-concerning document;
receiving a newly received information service application input from the user, the newly received information service application input comprising an input that selects the type of the newly received information service from among a general selective dissemination of information service, a legal selective dissemination of information service and a similarity retrieval selective dissemination of information service;
monitoring newly received documents in accordance with the newly received information service application input; and
informing the user of information on a newly received document that corresponds to an informing condition,
wherein if the general selective dissemination of information service is selected as the newly received information service, the document management system receives a retrieval expression from the user as the informing condition, determines whether a newly received document corresponds to the retrieval expression, and informs the user of the information on the newly received document if the newly received document corresponds to the retrieval expression, wherein if the legal selective dissemination of information service is selected as the newly received information service, the document management system receives an input that designates a reference document that was previously stored in the storage unit as the informing condition, extracts a representative value of the reference document, compares the reference document with a corresponding newly received document using the representative value, determines whether a legal status of the reference document is different from that of the corresponding newly received document, and informs the user of the information on the newly received document if the legal status of the reference document is different from that of the corresponding newly received document, wherein if the similarity retrieval selective dissemination of information service is selected as the newly received information service, the document management system receives an input that designates a reference document that was previously stored in the storage unit as the informing condition, determines whether a newly received document is similar to the reference document, and informs the user of the information on the newly received document if the newly received document is similar to the reference document.

11. The method according to claim 10, further comprising:
extracting features from documents previously stored in the database and determining similarity among the documents using the extracted features;
classifying the documents stored in the database according to a predetermined classification system based on the similarity among the documents; and
supervising, using the processor, whether newly received documents are provided to the database in a real time or according to a specific period, and automatically performing the similarity determination on the newly received documents so as to automatically classify the newly received documents.

12. The method according to claim 10, wherein the informing condition is a retrieval expression, and the step of monitoring comprises detecting the specific document which correspond to the retrieval expression among the newly received documents.

13. The method according to claim 10, wherein the informing condition is a reference document stored in the storage unit, and the step of monitoring comprises detecting the specific document which is similar to the reference document.

14. The method according to claim 10, wherein the documents stored in the storage unit comprise at least one of patent publication documents and issued patent documents.

15. The method according to claim 10, wherein the informing condition is a reference document stored in the storage unit, and the step of monitoring comprises detecting a change of a legal status of the reference document using the newly received documents, and the step of informing comprises informing the user of the detected change.

* * * * *